(12) United States Patent
Bae et al.

(10) Patent No.: US 8,868,646 B2
(45) Date of Patent: Oct. 21, 2014

(54) APPARATUS AND METHOD FOR GENERATING VIRTUAL GAME CLIENTS

(75) Inventors: Su-Young Bae, Daejeon (KR);
Hang-Kee Kim, Daejeon (KR);
Chang-Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 13/333,758

(22) Filed: Dec. 21, 2011

(65) Prior Publication Data
US 2012/0158830 A1  Jun. 21, 2012

(30) Foreign Application Priority Data
Dec. 21, 2010  (KR) .................. 10-2010-0131561

(51) Int. Cl.
*G06F 15/16* (2006.01)
*H04L 29/06* (2006.01)
*A63F 13/30* (2014.01)
*A63F 13/40* (2014.01)

(52) U.S. Cl.
CPC .............. *A63F 13/12* (2013.01); *H04L 69/03* (2013.01); *A63F 2300/534* (2013.01); *A63F 2300/535* (2013.01); *H04L 67/38* (2013.01); *A63F 2300/5533* (2013.01); *A63F 13/10* (2013.01)
USPC ............................................ 709/203; 463/42

(58) Field of Classification Search
USPC ............................................ 709/203; 463/42
See application file for complete search history.

(56) References Cited

U.S. PATENT DOCUMENTS

| | | | |
|---|---|---|---|
| 7,447,622 B2 * | 11/2008 | Arama et al. | 703/23 |
| 7,680,038 B1 * | 3/2010 | Gourlay | 370/230 |
| 2003/0130040 A1 * | 7/2003 | Dripps | 463/42 |
| 2005/0170891 A1 | 8/2005 | Shim et al. | |
| 2009/0156314 A1 | 6/2009 | Kim et al. | |
| 2010/0069155 A1 * | 3/2010 | Schwartz et al. | 463/42 |
| 2010/0173695 A1 * | 7/2010 | Hutcheson et al. | 463/23 |
| 2010/0197407 A1 * | 8/2010 | Kataoka et al. | 463/42 |

FOREIGN PATENT DOCUMENTS

KR  1020090065747 A  6/2009

* cited by examiner

*Primary Examiner* — Thomas Dailey (57) ABSTRACT

Disclosed herein are an apparatus and method for generating virtual game clients. The apparatus includes a description grammar module, a description generation module, and a client generation and control module. The description grammar module includes a game packet description grammar. The description generation module generates a game protocol description corresponding to the structure of a packet protocol of a game and a game protocol sequence description corresponding to the relationship of transmission and reception between packets, based on the game packet description grammar. The client generation and control module generates a virtual game client using the game protocol description and the game protocol sequence description.

18 Claims, 7 Drawing Sheets

| ACCTION_NAME | PARAMETER | EXAMPLE OF USE | DESCRIPTION |
|---|---|---|---|
| CONNECT | #SockNum | CONNECT 3 | GENERATE SOCKET NO. 3 AND THEN CONNECT |
| SEND | #Send_SockNum #Send_PacketNum | SEND 2 19 | TRANSMIT PACKET NO. 19 VIA SOCKET NO. 2 |
| DELAY | #DelaySec | DELAY 2.5 | WAIT FOR 2.5 SECONDS WITHOUT TAKING ACTION |
| RECV | #Send_SockNum #Send_PacketNum | RECV 2 10 | RECEIVE PACKET NO. 10 VIA SOCKET NO. 2 |
| ITERATION | #iter_cnt #iter_id | ITERATION 10 0 | ITERATE 10 TIMES, -1 INDICATES INFINITE ITERATION ITER_ID IS IDENTIFIER |
| END_ITERATION | #iter_id | END_ITERATION | ITER_ID IS IDENTIFIER |

FIG.7

| GRAMMAR COMPONENT | FIELD | EXAMPLE |
|---|---|---|
| PROTOCOL_ID | protocol_id, variable_type, variable_cnt, endian_type | PROTOCOL_ID(0,CHAR,$,LE) |
| DEFINED | reference_id, variable_type, variable_cnt optional_flag, endian_type | DEFINED(USER_LOGIN_NAME_CHAR_17,0,LE) |
| ITERATION_GROUP | reference_id, base_reference_id, counter_element, {element_list...} | ITERATION_GROUP(OTHER_CHAR_INFO_LIST, OTHER_CHAR_INFO,DEFINED(OTHER_CHAR_INFO_COUNT,SHORT_INT,1,OVERWRITE,0), {UNDEFINED(BYTE,2,03 01),DEFINED(OTHER_CHAR_ID,INT,1,OVER WRITE,0)}) |
| VARIABLE_LENGTH_GROUP | reference_id, element_subtype, length_element, value_element | VARIABLE_LENGTH_GROUP(CHAR_MSG_VLBIT_MASK_CNT_DEFEIND(CHAR_MSG_SIZE,INT,1, OVERWRITE,0),DEFINED(CHAR-MSG,CHAR, 0.OVERWRITE,0)) |
| CHECK_SUM | variable_type, variable_cnt start_index, endian_type | CHECK_SUM(SHORT_INT,1,0,LE) |
| DUMMY | element_subtype, variable_type, value, start_index, endian_type | DUMMY(MOD8,CHAR,00,6,LE) |

APPARATUS AND METHOD FOR GENERATING VIRTUAL GAME CLIENTS

CROSS REFERENCE TO RELATED APPLICATION

This application claims the benefit of Korean Patent Application No. 10-2010-0131561, filed on Dec. 21, 2010, which is hereby incorporated by reference in its entirety into this application.

BACKGROUND OF THE INVENTION

1. Technical Field

The present invention relates generally to a method and apparatus for generating virtual game clients and, more particularly, to a method and apparatus for generating virtual game clients using a game packet description grammar.

2. Description of the Related Art

A virtual game client is a game client which is virtually generated to test the stability of a conventional online game server.

A virtual game client is used to conduct an access load test which tests access load which is generated by a large number of users who are accessing a game server. Virtual game clients include packet replay-based virtual game clients which capture packets generated by an actual game client and repeatedly transmit the captured packets, and virtual game clients which generate large numbers of several predefined packets such as login, movement and attack packets.

Such virtual game clients are general-purpose game clients. Although these virtual game clients have the advantage of being applicable to a variety of games, they cannot provide a variety of functionalities which actual game clients provide, so that it is difficult to test game servers in a variety of fields, and instead they simply test the load imposed on a server when a large number of users simultaneously access the server.

In contrast, although virtual game clients specialized for specific games can test a variety of functionalities of online game servers in detail, they have the disadvantage of being applicable only to the corresponding games. Furthermore, the virtual game clients specialized for specific games have the disadvantage of incurring repetitive effort and cost because a virtual game client must be generated for every new game.

SUMMARY OF THE INVENTION

Accordingly, the present invention has been made keeping in mind the above problems occurring in the prior art, and an object of the present invention is to provide a method and apparatus which are capable of generating a virtual game client specialized for each game using a game packet description grammar without changing the code of a software program.

In order to accomplish the above object, the present invention provides an apparatus for generating virtual game clients, including a description grammar module including a game packet description grammar; a description generation module for generating a game protocol description corresponding to the structure of a packet protocol of a game and a game protocol sequence description corresponding to the relationship of transmission and reception between packets, based on the game packet description grammar; and a client generation and control module for generating a virtual game client using the game protocol description and the game protocol sequence description.

The client generation and control module may include a list generation unit for generating a packet protocol sequence tree list and a packet protocol list by analyzing the game protocol description and the game protocol sequence description; a control unit for generating a plurality of virtual users, managing the plurality of virtual users in groups, and giving each virtual user group instructions; and a packet management unit for managing packets by generating packets corresponding to the instructions of the control unit and transmitting the packets to the game server, and receiving packets from the game server.

The packet protocol sequence tree list and the packet protocol list may correspond to the data structure of a software program.

The packet management unit may include a packet generator for searching the packet protocol sequence tree list for a packet sequence tree corresponding to the instruction, determining a packet protocol based on the packet sequence tree, and generating packets corresponding to the packet protocol using the packet protocol list; a packet analyzer for receiving packets from the game server, and determining whether the received packets are packets corresponding to the packet protocol sequence tree; and a table for mapping analysis results of the packet analyzer to the virtual user.

The description grammar module may include a sequence definition grammar unit including a packet sequence definition grammar which represents a relationship between transmission and reception of a plurality of packets; and a structure definition grammar unit including a packet structure definition grammar which represents a structure of each game packet protocol.

The grammar structure of the packet sequence definition grammar for defining a single packet sequence may include the start, middle and end of the packet sequence.

The packet structure definition grammar may include protocol headers and field information, the meanings and lengths of fields, type information, information related to a single field or a group field, and information related to a variable length.

Each unit set of the packets corresponds to each action of a character of the game or each action which is performed by the game server.

The game protocol description and the game protocol sequence description may be generated in text or eXtensible Markup Language (XML) form.

In order to accomplish the above object, the present invention provides a method of generating virtual game clients, including generating a game protocol description and a game protocol sequence description, based on a game packet description grammar; generating a packet protocol sequence tree list and a packet protocol list based on the game protocol description and the game protocol sequence description; giving each virtual user group instructions; generating a packet using the game packet description grammar; and generating a virtual game client by mapping the results of analysis of the packet to the virtual user.

The generating a virtual game client may include transmitting the generated packet to a game server; receiving a packet corresponding to the transmitted packet from the game server; determining whether the received packet is a packet corresponding to the packet protocol sequence tree; and searching the packet protocol list for a protocol structure corresponding to the packet, and analyzing search results.

The generating a packet may include searching the packet protocol sequence tree list for a packet sequence tree corresponding to the instruction; determining a packet protocol based on the packet sequence tree corresponding to search results; and searching the packet protocol list for a packet structure corresponding to the packet protocol, and generating the packet.

The packet protocol sequence tree list and the packet protocol list may correspond to a data structure of a software program.

The game packet description grammar may include a packet sequence definition grammar representative of a relationship between transmission and reception of a plurality of packets and a packet structure definition grammar representative of a structure of each game packet protocol.

The grammar structure of the packet sequence definition grammar for defining a single packet sequence may include the start, middle and end of the packet sequence.

The packet structure definition grammar may include protocol headers and field information, the meanings and lengths of fields, type information, information related to a single field or a group field, and information related to a variable length.

Each unit set of the packets may correspond to each action of a character of the game or each action which is performed by the game server.

The game protocol description and the game protocol sequence description may be generated in text or XML form.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components.

The present invention will be described in detail below with reference to the accompanying drawings. Repetitive descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

A method and apparatus for generating virtual game clients according to embodiments of the present invention will be described in detail below with reference to the accompanying drawings.

The virtual game client according to the embodiments of the present invention is a dummy client which is recognized as an actual user by a game server but performs network communication with the game server via game performance data without generating graphics and sounds.

Figure 1:
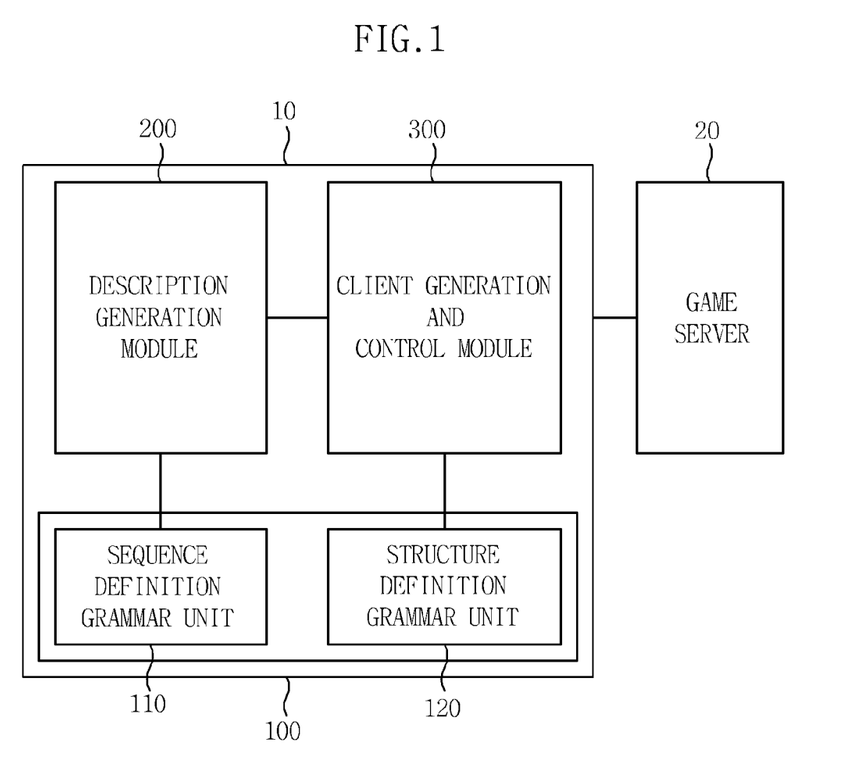
FIG. 1 is a diagram schematically illustrating the configuration of an apparatus for generating virtual game clients according to an embodiment of the present invention.

FIG. 1 is a diagram schematically illustrating the configuration of an apparatus 10 for generating virtual game clients according to an embodiment of the present invention.

Referring to FIG. 1, the apparatus 10 for generating virtual game clients generates a virtual game client which corresponds to an actual game client and is used to test the online stability of a game server 20.

The apparatus 10 for generating virtual game clients includes a description grammar module 100, a description generation module 200, and a client generation and control module 300.

The description grammar module 100 includes a game packet description grammar including a packet sequence definition grammar and a packet structure definition grammar. For this purpose, the description grammar module 100 includes a sequence definition grammar unit 110 and a structure definition grammar unit 120.

The sequence definition grammar unit 110 includes a packet sequence definition grammar which represents the relationship between the transmission and reception of a plurality of packets for each action of a character of a game or for each action which is performed by the game server 20.

The structure definition grammar unit 120 includes a packet structure definition grammar which represents the structure of each game packet protocol.

The description generation module 200 generates a game protocol description descriptive of the structure of the packet protocol of a designated game and a game protocol sequence description descriptive of the relationship between the transmission and reception of packets based on the game packet description grammar. Here, the game protocol description and the game protocol sequence description may be generated in the form of text or eXtensible Markup Language (XML).

Figure 2:
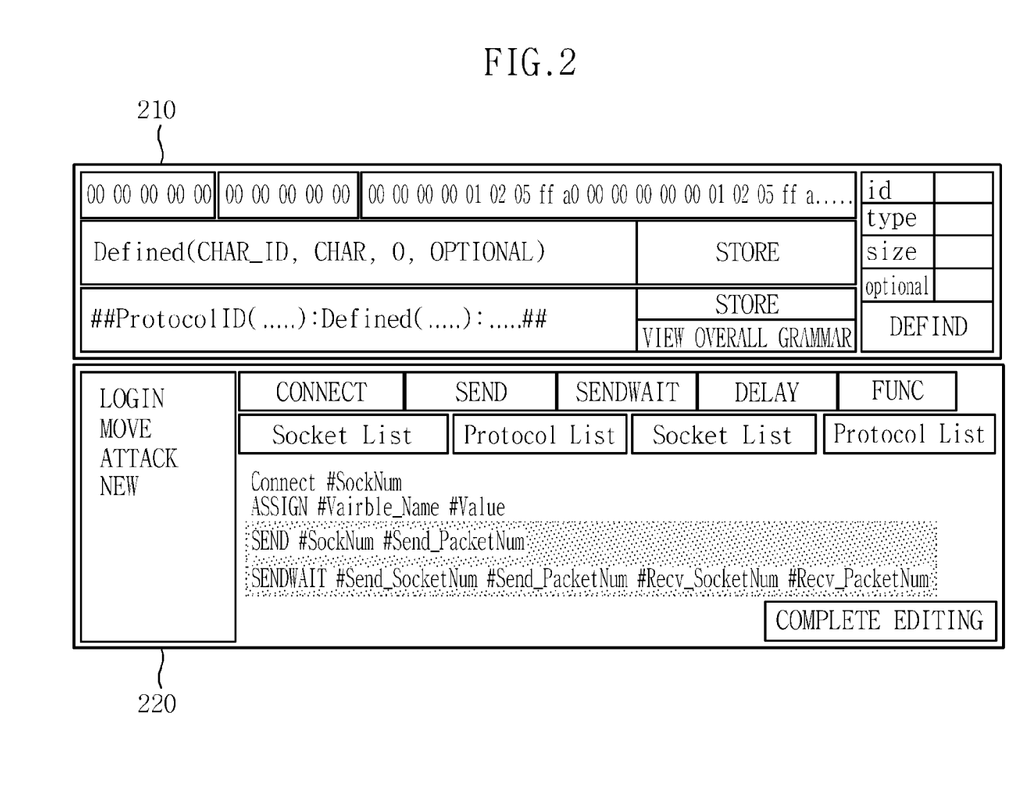
FIG. 2 is a diagram illustrating a user interface according to an embodiment of the present invention.

The description generation module 200 provides a user interface, such as that shown in FIG. 2, to a user. Using the user interface, the game protocol description and the game protocol sequence description are generated by the user.

Referring to FIG. 2, the user interface includes, for example, a packet structure description generation user interface 210 and a packet sequence description generation user interface 220.

That is, the description generation module 200 generalizes and describes packet information, unique to each of a variety of types of games, for the game using the game packet description grammar.

The client generation and control module 300 generates a virtual client including packets, such as packets generated by an actual game client, based on the packet information received via the game protocol description and the game protocol sequence description. Thereafter, the client generation and control module 300 can test the load and stability of the game server using the generated packets.

Next, the client generation and control module 300 will be described in detail with reference to FIG. 3.

Figure 3:
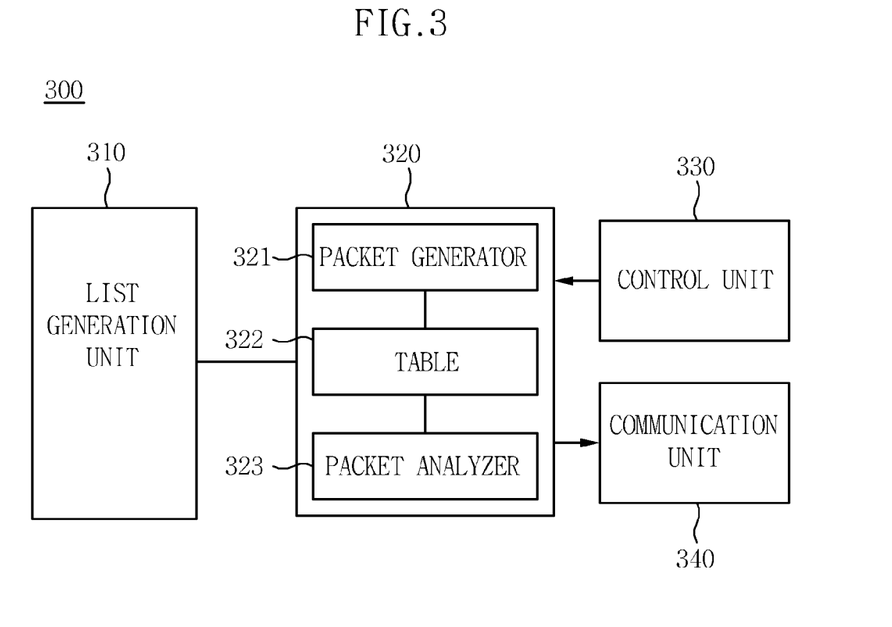
FIG. 3 is a diagram showing the configuration of a client generation and control module according to an embodiment of the present invention.

FIG. 3 is a diagram showing the configuration of a client generation and control module 300 according to an embodiment of the present invention.

Referring to FIG. 3, the client generation and control module 300 includes a list generation unit 310, a packet management unit 320, a control unit 330, and a communication unit 340.

The list generation unit 310 generates a packet protocol sequence tree list and a packet protocol list corresponding to the data structure of a software program by analyzing the game protocol description and the game protocol sequence description.

The control unit 330 generates a plurality of virtual users, and manages the plurality of generated virtual users in groups. Furthermore, the control unit 330 instructs each virtual user group to take an action. Here, the action to be taken is a specific action which is requested to be performed on a virtual user via the user interface, an action which is requested by the game server 20, or an action which should be taken at a regular interval using a timer. A packet sequence for the action is defined in the packet protocol sequence tree list.

The packet management unit 320 includes a packet generator 321, a table 322, and a packet analyzer 323.

The packet generator 321 searches the packet protocol sequence tree list for a packet sequence tree which corresponds to the instruction of the control unit 330, and searches for a packet protocol to be generated based on the packet sequence tree corresponding to a search result. Once the packet protocol has been determined, the packet generator 321 searches the packet protocol list for the structure of a corresponding packet, and generates the packet by filling in the fields of the packet using a table 322. Thereafter, the packet generator 321 transmits the generated packet to the game server 20 via the communication unit 340.

The packet analyzer 323 receives the packet from the game server 20 via the communication unit 340, and determines whether the received packet is a packet corresponding to the packet protocol sequence tree. Thereafter, the packet analyzer 323 searches the packet protocol list for the structure of a protocol corresponding to determination results, and analyzes search results. In this case, analysis results are automatically stored in a table 322.

The table 322 maps the analysis results of the packet analyzer 323 to each virtual user which is being managed by the control unit 330.

Next, a method of generating virtual game clients will be described in detail with reference to FIG. 4.

Figure 4:
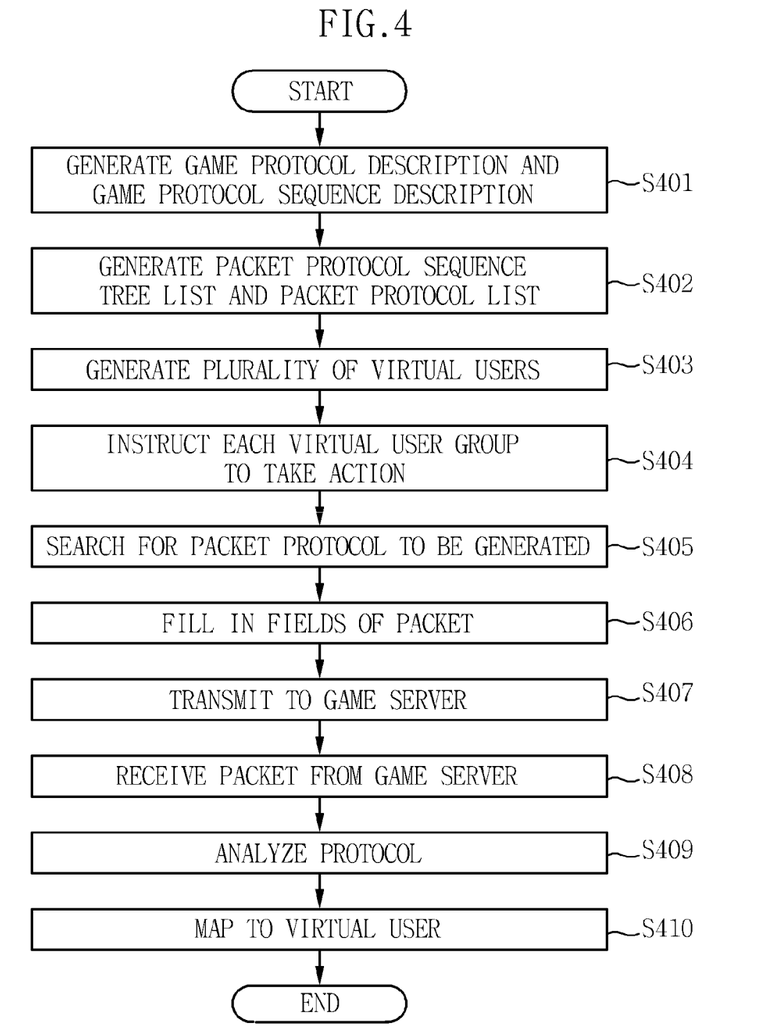
FIG. 4 is a flowchart illustrating a method of generating virtual game clients according to an embodiment of the present invention.

FIG. 4 is a flowchart illustrating a method of generating virtual game clients according to an embodiment of the present invention.

First, the apparatus 10 for generating virtual game clients includes a game packet description grammar including a packet sequence definition grammar and a packet structure definition grammar.

Referring to FIG. 4, the apparatus 10 for generating virtual game clients generates a game protocol description descriptive of the structure of the packet protocol of a designated game and a game protocol sequence description descriptive of the relationship between the transmission and reception of packets based on the game packet description grammar at step S401.

The apparatus 10 for generating virtual game clients generates a packet protocol sequence tree list and a packet protocol list based on the game protocol description and the game protocol sequence description at step S402. Here, the packet protocol sequence tree list and the packet protocol list correspond to the data structure of a software program.

The apparatus 10 for generating virtual game clients generates a plurality of virtual users and then manages the plurality of generated virtual users in groups at step S403.

The apparatus 10 for generating virtual game clients instructs each virtual user group to take an action at step S404.

The apparatus 10 for generating virtual game clients searches the packet protocol sequence tree list for a packet sequence tree corresponding to the instruction and then searches for a packet protocol to be generated based on the packet sequence tree corresponding to search results at step S405.

Once the packet protocol has been determined, the apparatus 10 for generating virtual game clients searches the packet protocol list for the structure of a corresponding packet and then generates the packet by filling in the fields of the packet using the table 322 at step S406.

The apparatus 10 for generating virtual game clients transmits the generated packet to the game server 20 at step S407.

The apparatus 10 for generating virtual game clients receives a packet corresponding to the transmitted packet from the game server 20 and then determines whether the received packet is a packet corresponding to the packet protocol sequence tree at step S408.

If the received packet is a packet corresponding to the packet protocol sequence tree, the apparatus 10 for generating virtual game clients searches the packet protocol list for the structure of a protocol corresponding to the packet and then analyzes search results at step S409.

The apparatus 10 for generating virtual game clients generates a virtual game client by mapping analysis results to each virtual user at step S410.

Next, a method in which the apparatus 10 for generating virtual game clients generates a packet using a packet description grammar will be described in detail with reference to FIG. 5.

Figure 5:
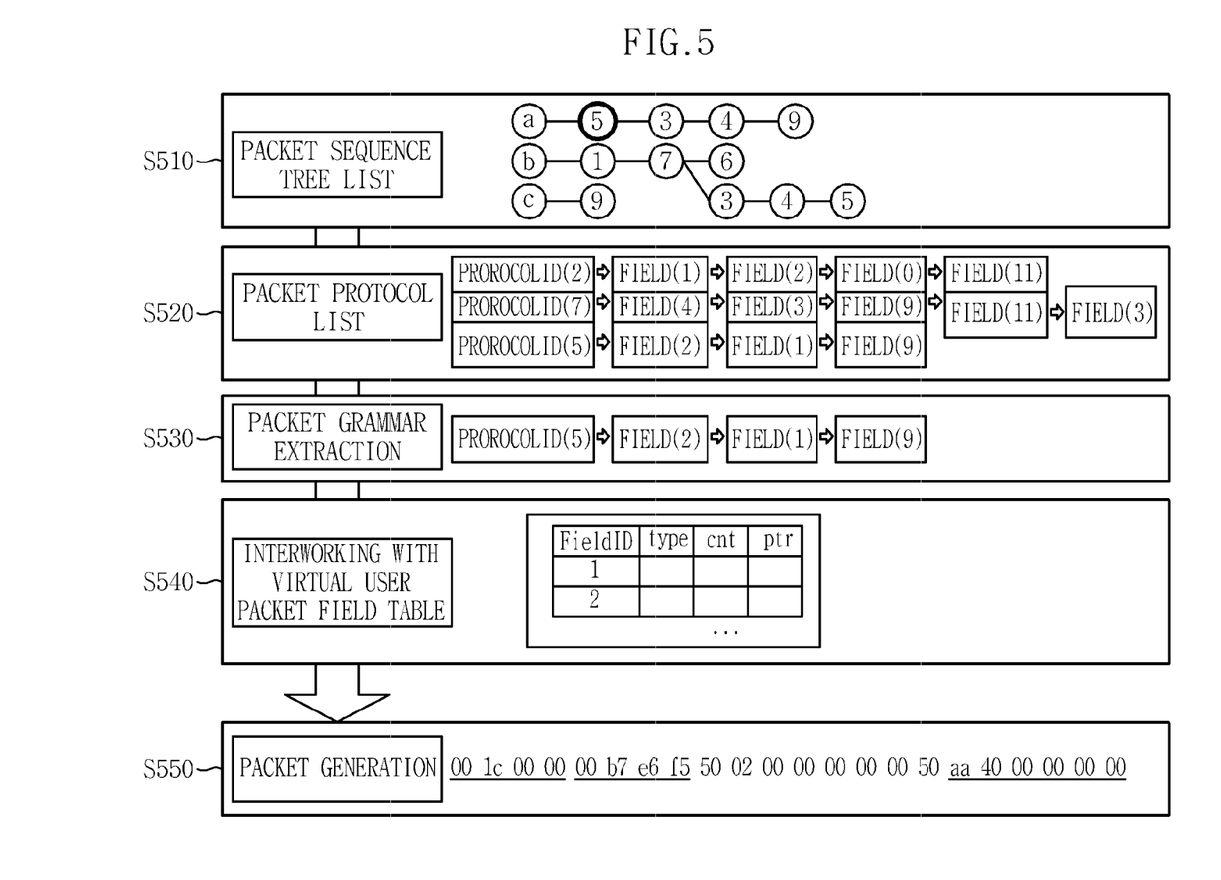
FIG. 5 is a diagram illustrating a method of generating packets using a packet description grammar according to an embodiment of the present invention.

FIG. 5 is a diagram illustrating a method of generating packets using a packet description grammar according to an embodiment of the present invention.

First, the packet management unit 320 of the apparatus 10 for generating virtual game clients generates a packet using the game packet description grammar.

Referring to FIG. 5, the packet management unit 320 searches a packet protocol sequence tree list for a packet sequence tree corresponding to action "a" (for example, packet sequence tree "a") at step S510.

If a packet to be first generated in the packet sequence tree is protocol packet "5", the packet management unit 320 searches the packet protocol list for protocol "5" at step S520.

The packet management unit 320 searches for the structure of a packet corresponding to protocol "5" using the game packet description grammar at step S530. Here, the game packet description grammar includes a packet sequence definition grammar and a packet structure definition grammar.

In the packet sequence definition grammar, a grammar structure for defining a packet sequence is illustrated in Table 1.

The definition unit of a packet sequence corresponds to a set of packets which can represent the entirety of a single action. For example, when a virtual user takes a single action, the packet management unit 320 generates packets while referring to the defined packet sequence, transfers the generated packets to the game servers 20, and analyzes packets received from the game server 20.

TABLE 1

```
<<ACTION(name, id, type_sub)>>
<<ACTION_ELEMENT(para1, para2, para3, •••)>>
<<ACTION_ELEMENT(para1, para2, para3, •••)>>
<<ACTION_ELEMENT(para1, para2, para3, •••)>>
<<END_ACTION>>
```

Referring to Table 1, <<ACTION name, id, type_sub>> is the start of a single packet sequence, and <<END_ACTION>> is the end thereof.

In <<ACTION name, id, type_sub>>, the meanings of "name," "id" and "type_sub" are as follows:

name: a name indicative of the meaning of a virtual user action which will be represented by the sequence set id: an ID which enables the corresponding packet sequence set to be distinguished from other packet sequence sets type_sub: information indicative of where an event used to perform the initiation of the packet sequence set is received from (for example, including information about whether the sequence set is performed based on a packet transmission and reception method or based on a timer response method and information about whether, in the case of the packet transmission and reception method, an action of the game client will be performed or an action has been requested by the server)

Figure 6:
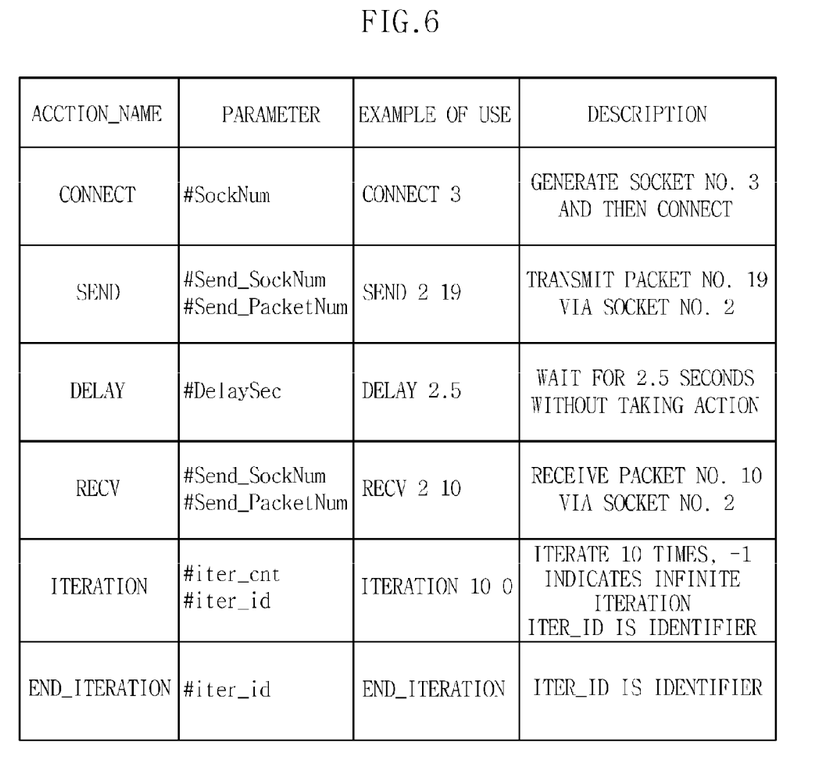
FIG. 6 is a table showing the types of ACTION_ELEMENT according to an embodiment of the present invention.

<<ACTION_ELEMENT(para1, para2, para3, . . . )>> defines items which should be performed in sequence. Here, the types of ACTION_ELEMENT are illustrated in FIG. 6.

In the game packet description grammar, the packet structure definition grammar represents the structure of packets and field information using predetermined reserved terms. Furthermore, the packet structure definition grammar includes protocol headers and field information, the meanings and lengths of fields, type information, information related to a single field or a group (composite) field, and information related to a variable length.

The packet structure definition grammar is illustrated in the following Table 2:

TABLE 2

```
##FIELD_ELEMENT(para1, para2, para3, •••):
   FIELD_ELEMENT(para1, para2,
para3, •••): FIELD_ELEMENT(para1, para2, para3, •••): •••##
```

Referring to Table 2, FIELD_ELEMENT is a unit which corresponds to each field of a packet protocol. FIELD_ELEMENT includes PROTOCOL_ID, DEFINED, DUMMY, CHECKSUM, ITERATION_GROUP, VARIABLE_LENGTH_GROUP, and BITMASK_GROUP. Here, PROTOCOL_ID, DEFINED, DUMMY, and CHECKSUM represent single fields, while ITERATION_GROUP, VARIABLE_LENGTH_GROUP, BITMASK_GROUP represent group fields.

Each FIELD_ELEMENT includes detailed attributes suitable for it. The detailed attributes are illustrated in FIG. 7.

Figure 7:
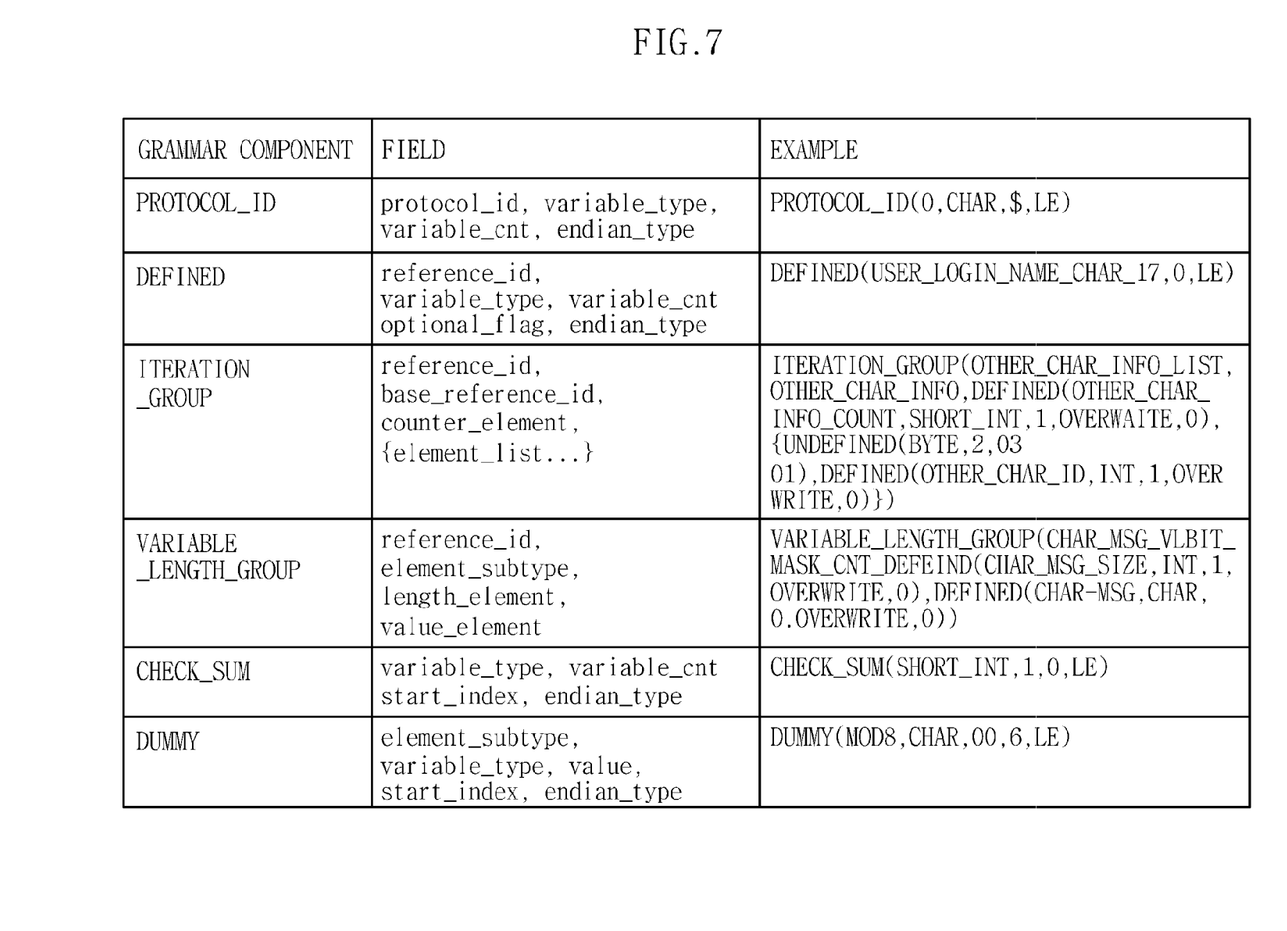
FIG. 7 is a table showing the detailed attributes of FIELD_ELEMENT according to an embodiment of the present invention.

Referring to FIG. 7, reference_id is a field unique ID, and variable_type is a variable type used to store a field value. Furthermore, used_variable_cnt allows the number of designated and used variable types to be determined and then allows the size of memory, to be read from or written to, to be determined. optional_flag indicates whether the fields within the protocol are requisite or optional.

The game packet description grammar according to an embodiment of the present invention may be represented in a variety of forms.

Thereafter, the packet management unit 320 interworks with a table 322 including virtual user packet fields corresponding to the structure of a packet defined for a designated protocol at step S540.

Thereafter, the packet management unit 320 automatically generates the packet by reading values from the virtual user packet fields corresponding to the structure of the packet at step S550.

The present invention has the advantage of representing the structures of packets and the relationship between the packets for a variety of games using a game packet description grammar capable of generalizing and representing game packets, thereby easily and rapidly generating virtual users specialized for respective games without modifying software.

Furthermore, the present invention has the advantage of easily generating a virtual game client for testing load imposed on an online game server for each game and easily applying it to the test, and the advantage of being able to rapidly test load imposed on online game servers in a variety of forms using a mechanism which tests load imposed on a server and is specialized for each game.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A non-transitory computer readable medium having stored thereon a computer program for generating virtual game clients that are used to test a game server, which, when executed by a processor, performs a method, the method comprising:

storing a game packet description grammar capable of describing packet information unique to each of a plurality of games;

generating a game protocol description describing a structure of a packet protocol for a specific game among the plurality of games and a game protocol sequence description for describing a relationship between transmission and reception of packets for the specific game, using the game packet description grammar;

generating packets for the specific game using the game protocol description and the game protocol sequence description;

transmitting the packets to the game servers;

receiving packets corresponding to the transmitted packets from the game servers; and generating the virtual game clients based on analyzed results of the received packets.

2. The non-transitory computer readable medium as set forth in claim 1, wherein method further comprises:

generating a packet protocol sequence tree list and a packet protocol list by analyzing the game protocol description and the game protocol sequence description;

generating a plurality of virtual users;

managing the plurality of virtual users in groups;

sending each virtual user group instructions;

generating packets corresponding to the instructions;

analyzing the received packets; and mapping the analyzed results to the virtual users to generate the virtual game clients.

3. The non-transitory computer readable medium as set forth in claim 2, wherein the packet protocol sequence tree list and the packet protocol list correspond to a data structure of a software program.

4. The non-transitory computer readable medium as set forth in claim 2, further comprising:
searching the packet protocol sequence tree list for a packet sequence tree corresponding to the instructions;
deciding a packet protocol based on the packet sequence tree;
generating packets corresponding to the packet protocol using the packet protocol list;
determining whether the received packets are packets corresponding to the packet protocol sequence tree; and
storing information to map results of the determination to the virtual users.

5. The non-transitory computer readable medium as set forth in claim 1, wherein:
a packet sequence definition grammar which defines the relationship between transmission and reception of a plurality of packets is defined by a sequence definition grammar; and
wherein a structure of a packet protocol for each of the plurality of games is defined by a structure definition grammar.

6. The non-transitory computer readable medium as set forth in claim 5, wherein a grammar structure of the packet sequence definition grammar for defining a single packet sequence comprises a start, middle and end of the single packet sequence.

7. The non-transitory computer readable medium as set forth in claim 5, wherein the packet structure definition grammar comprises protocol headers and field information, meanings and lengths of fields, type information, information related to a single field or a group field, and information related to a variable length.

8. The non-transitory computer readable medium as set forth in claim 1, wherein each unit set of the packets corresponds to each action of a character of the specific game or each action which is performed by the game server.

9. The non-transitory computer readable medium as set forth in claim 1, wherein the game protocol description and the game protocol sequence description are generated in a text or eXtensible Markup Language (XML) form.

10. A computer-implemented method of generating virtual game clients that are used to test a game server, the computer-implemented method comprising:
generating a game protocol description and a game protocol sequence description for a specific game among a plurality of games using a game packet description grammar, the game packet description grammar being capable of describing packet information unique to each of the plurality of games;
generating a packet protocol sequence tree list and a packet protocol list based on the game protocol description and the game protocol sequence description;
sending each of virtual user groups instructions, a virtual user group including a plurality of virtual users;
generating a packet corresponding to the instructions using the packet protocol sequence tree list and the packet protocol list;
transmitting the packet to the game server;
receiving a packet corresponding to the transmitted packet from the game server;
analyzing the received packet; and
generating the virtual game clients by mapping results of the analysis of the received packet to the virtual user groups.

11. The method as set forth in claim 10, wherein the analyzing the received packet comprises:
determining whether the received packet is a packet that corresponds to a packet protocol sequence tree corresponding to the instructions; and
searching the packet protocol list for a protocol structure corresponding to the packet, and analyzing search results.

12. The method as set forth in claim 10, wherein the generating a packet comprises:
searching the packet protocol sequence tree list for a packet protocol sequence tree corresponding to the instructions;
determining a packet protocol based on the packet sequence tree; and
searching the packet protocol list for a packet structure corresponding to the packet protocol, and generating the packet based on the packet structure.

13. The method as set forth in claim 10, wherein the packet protocol sequence tree list and the packet protocol list correspond to a data structure of a software program.

14. The method as set forth in claim 10, wherein the game packet description grammar comprises a packet sequence definition grammar for defining a relationship between transmission and reception of a plurality of packets and a packet structure definition grammar for defining a structure of a packet protocol for each of the plurality of games.

15. The method as set forth in claim 14, wherein a grammar structure of the packet sequence definition grammar for defining a single packet sequence comprises a start, middle and end of the single packet sequence.

16. The method as set forth in claim 14, wherein the packet structure definition grammar comprises protocol headers and field information, meanings and lengths of fields, type information, information related to a single field or a group field, and information related to a variable length.

17. The method as set forth in claim 10, wherein each unit set of the packet corresponds to each action of a character of the specific game or each action which is performed by the game server.

18. The method as set forth in claim 10, wherein the game protocol description and the game protocol sequence description are generated in a text or XML form.

* * * * *